(12) United States Patent
Chen

(10) Patent No.: US 9,164,987 B2
(45) Date of Patent: *Oct. 20, 2015

(54) TRANSLATING A SEARCH QUERY INTO MULTIPLE LANGUAGES

(75) Inventor: Johnny Chen, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/024,741

(22) Filed: Feb. 10, 2011

(65) Prior Publication Data

US 2011/0137926 A1 Jun. 9, 2011

Related U.S. Application Data

(63) Continuation of application No. 11/781,073, filed on Jul. 20, 2007, now Pat. No. 7,890,493.

(51) Int. Cl.
G06F 17/30 (2006.01)
G06F 17/28 (2006.01)

(52) U.S. Cl.
CPC ........ *G06F 17/289* (2013.01); *G06F 17/30864* (2013.01)

(58) Field of Classification Search
CPC G06F 17/289; G06F 17/275; G06F 17/30011
USPC ........... 707/999.003–999.007, 723–735, 713, 707/756, 708, 706
See application file for complete search history.

(56) References Cited

U.S. PATENT DOCUMENTS

| 5,802,515 A | 9/1998 | Adar et al. |
| 5,920,859 A | 7/1999 | Li |
| 6,006,221 A | 12/1999 | Liddy et al. |
| 6,070,176 A | 5/2000 | Downs et al. |
| 6,321,189 B1 | 11/2001 | Masuichi et al. |
| 6,349,276 B1 * | 2/2002 | McCarley ......... 704/8 |
| 6,381,598 B1 | 4/2002 | Williamowski et al. |
| 6,385,568 B1 | 5/2002 | Brandon et al. |

(Continued)

FOREIGN PATENT DOCUMENTS

| JP | H10228485 A | 8/1998 |
| JP | 11219368 A | 8/1999 |

(Continued)

OTHER PUBLICATIONS

International Search Report and Written Opinion for International Application No. PCT/US20081070478, mailed Dec. 30, 2008, 11 pages.

(Continued)

*Primary Examiner* — Jacob F Bétit
*Assistant Examiner* — Amanda Willis
(74) *Attorney, Agent, or Firm* — Remarck Law Group PLC

(57) ABSTRACT

A computer-implemented method can include translating a search query from a first language to a second language, comparing the translated query with content in the second language, and identifying content in the second language relevant to the translated query based on the comparing. Also, a computer-implemented method can include translating content in a second language at one or more network locations into a first language, comparing the translated content with a search query written in the first language, and identifying, from the translated content, content relevant to the query based on the comparing.

22 Claims, 3 Drawing Sheets

(56) References Cited

U.S. PATENT DOCUMENTS

| | | | |
|---|---|---|---|
| 6,418,403 B2 | 7/2002 | Fuji | |
| 6,523,000 B1 | 2/2003 | Ando et al. | |
| 6,604,101 B1* | 8/2003 | Chan et al. | 707/706 |
| 6,647,364 B1 | 11/2003 | Yumura et al. | |
| 6,757,646 B2 | 6/2004 | Marchisio | |
| 6,952,691 B2 | 10/2005 | Drissi et al. | |
| 7,146,358 B1 | 12/2006 | Gravano et al. | |
| 7,149,681 B2 | 12/2006 | Hu et al. | |
| 7,890,493 B2* | 2/2011 | Chen | 707/713 |
| 8,135,575 B1* | 3/2012 | Dean | 704/7 |
| 2001/0012992 A1 | 8/2001 | Kimpara et al. | |
| 2002/0002452 A1 | 1/2002 | Christy et al. | |
| 2002/0007384 A1 | 1/2002 | Ushioda et al. | |
| 2002/0013693 A1 | 1/2002 | Fuji | |
| 2002/0023091 A1 | 2/2002 | Silberberg et al. | |
| 2002/0073075 A1* | 6/2002 | Dutta et al. | 707/3 |
| 2002/0111967 A1 | 8/2002 | Nagase | |
| 2002/0169770 A1 | 11/2002 | Kim et al. | |
| 2002/0193983 A1 | 12/2002 | Tokieda et al. | |
| 2007/0027905 A1 | 2/2007 | Warren et al. | |
| 2008/0189257 A1* | 8/2008 | Wiseman et al. | 707/4 |
| 2008/0288474 A1* | 11/2008 | Chin et al. | 707/4 |

FOREIGN PATENT DOCUMENTS

| | | |
|---|---|---|
| JP | 2002063201 A | 2/2002 |
| JP | 2004094721 A | 3/2004 |
| JP | 2004511867 A | 4/2004 |
| JP | 2005011138 A | 1/2005 |
| JP | 2005025478 A | 1/2005 |
| JP | 2005044075 A | 2/2005 |
| JP | 2005332014 A | 12/2005 |
| WO | 0231814 A1 | 4/2002 |

OTHER PUBLICATIONS

Martin Braschler et al., "Experiments with the Eurospider Retrieval System for CLEF 2000", CLEF 2000, LNCS 2069, Jan. 1, 2001, pp. 140-148, XP55028061.

Douglas W. Oard., "A Comparitive Study of Query and Document Translation for Cross-Language Information Retrieval", Third Conference of the Association for Machine Translation in the Americas, AMTA '98, Oct. 28, 1998, XP55028048.

European Search Report for Application No. 08782062.7 dated May 25, 2012.

1997. Logos machine translation system. In Proceedings of the Fifth Conference on Applied Natural Language Processing: Descriptions of System Demonstrations and Videos (Washington, DC, Mar. 31-Apr. 3, 1997) 251-252. Applied Natural Language Conferences. Morgan Kaufmann Publishers, San Francisco, CA, 17-17.

2002. Bablefish Machine Translation Program: Frequently Asked Question. AltaVista Search Company. http://web.archive.org/web/20011217215320/help.altavista.com/babelfish/ba-bel.sub.--faq.

Buitelaar, P., Netter, K., Xu, F., Integrating Different Strategies for Cross-Language Information Retrieval in the MIETTA Project. Proceedings of the 14th Twente Workshop on Language Technology (TWLT), Enschede, Netherlands, Dec. 1998. Also available at http://citeseer.nj.nec.com/435447.htm.

Capstick, J., Diagne, A. K., Erbach, G., Uszkoreit, H., Leisenberg, A., and Leisenberg, M. 2000. A system for supporting cross-lingual information retrieval. Inf. Process. Manage. 36, (Jan. 2, 2000), 275-289. DOI= http://dx.doi.org/10.1016/S0306-4573(99)00058-8.

Hull, D. A. and Grefenstette, G. 1996. Querying across languages: a dictionary-based approach to multilingual information retrieval. In Proceedings of the 19th Annual international ACM SIGIR Conference on Research and Development in information Retrieval (Zurich, Switzerland, Aug. 18-22, 1996). SIGIR '96. ACM, New York, NY, 49-57.

Jian Y. Nie and Jiang Chen. 2002. Exploiting theWeb as Parallel Corpora for Cross-Language Infor-mation Retrieval Web Intelligence, pp. 218-239.

Kraaij, W., Nie, J., and Simard, M. 2003. Embedding web-based statistical translation models in cross-language information retrieval. Comput. Linguist. 29, (Sep. 3, 2003), 381-419. DOI= http://dx.doi.org/10.1162/089120103322711587.

Lu, W., Chien, L, and Lee, H. 2002. Translation of web queries using anchor text mining. ACM Transactions on Asian Language Information Processing (TALIP) 1, (Jun. 2, 2002), 159-172. DOI= http://doi.acm.org/10.1145/568954.568958.

Oard et al., Document Translation for Cross-Language Text Retrieval at the University of Maryland, presented at the Sixth Text REtrieval Conference (TREC-6), Nov. 1997.

Oard, D. et al., "A Comparative Study of Query and Document Translation for Cross-Language Information Retrieval," presented at the Third Conference of the Association for Machine Translation in the Americas (AMTA), Oct. 1998, 12 pages.

Resnik, P. (1998). Parallel strands: A preliminary investigation into mining the web for bilingual text. In Third Conference of the Association for Machine Translation in the Americas, pp. 1-11.

TWLT 14, Language Technology in Multimedia Information Retrieval, Proceedings of the Fourteenth Twente Workshop On Language Technology, Dec. 7-8, 1998, Enschede, The Netherlands, 214 pages.

Wen-Hsiang Lu, Lee-Feng Chien, Hsi-Jian Lee. LiveTrans: Translation Suggestion for Cross-Language Web Search from Web Anchor Texts and Search Results. Proceedings of Research on Computational Linguistics Conference XV (ROCLING), 57-72, 2003.

* cited by examiner

TRANSLATING A SEARCH QUERY INTO MULTIPLE LANGUAGES

CROSS REFERENCE TO RELATED APPLICATION

This application is a continuation of and claims priority to U.S. patent application Ser. No. 11/781,073, entitled "Translating a Search Query into Multiple Languages," and filed on Jul. 20, 2007, now allowed. The entire contents of this application are incorporated herein by reference in its entirety.

TECHNICAL FIELD

The following description relates to systems and techniques for searching for content on a network.

BACKGROUND

The internet provides an extensive resource for obtaining information. Search engines, e.g., the Google search engine offered by Google Corporation (Mountain View, Calif., USA), the Yahoo search engine offered by Yahoo Inc. (Sunnyvale, Calif., USA), and the like, can harness the extensive information available on the internet and, by creating an index database of the content available on web pages of web sites, make it available for searching. A search engine can present a user interface, e.g., a text box on a web page such as www.google.com, in which a user can enter a query relevant to a topic of interest. The contents of a query can be compared with the contents of the indexed database. A web page of a web site that contains content that matches the query can be identified and the identified web site can be presented to the user. In this manner, a user, who may otherwise be unaware of the internet location containing content of interest, can be presented with web pages containing topics of interest.

Content, e.g., text, on web pages can be in any of many different languages. Content on the internet can include web pages that contain text written in any language and uploaded for inclusion to the internet. A translator (e.g., a computer translation program) can be configured to translate the content of a web page written in a first language into a second language. Translators can enable users to read the contents of one or more web pages written in another language by translating the content into a language specified by the user.

SUMMARY

In general, this document describes expanding the volume of content that is searched based on a search query to include corpora written in several languages. In one example, a search query entered by a user in one language can be translated into one or more other languages. The translated search query can be compared with content written in one of the other languages. Based on the comparing, content relevant to a search query can be identified where the content is written in languages that are both the same as and different from the user's language. Subsequently, the identified content can be translated into the user's language and presented to the user.

In one aspect, a computer-implemented method is described. The method includes translating a search query from a first language to a second language, comparing the translated query with content in the second language, and identifying content in the second language relevant to the translated query based on the comparing.

This, and other aspects, can include one or more of the following features. The method can include translating the search query into a plurality of other languages, comparing each of the translated search queries with content in a language corresponding to each of the other languages, and identifying relevant content in the other languages based on the comparing. The method can further include translating the search query into an intermediate language, and translating the intermediate language search query into the plurality of other languages. The method can further include receiving the search query from a first network location of a plurality of network locations. The method can further include obtaining content from one or more network locations of the plurality of network locations. The identified content can be included in at least a portion of a second network location of the plurality of network locations. The second network location can be identified by a second identifier. The method can further include presenting the second identifier to a user at the first network location. The method can further include detecting a selection of the second identifier, in response to the detecting, retrieving the content written at the second network location, translating the content written at the second network location into the first language, and presenting the translated content to a user at the first network location. The method can further include comparing the search query with content written in the first language. The method can further include identifying content written in the first language relevant to the search query based on the comparing. The identified content can be located in at least a portion of a third network location. The third a network location can be identified by a third identifier. The method can further include presenting the third identifier to a user at the first network location. The second language can be chosen based on user input. The second language can be chosen based on the search query.

In another aspect, a system is described. The system includes an engine configured to translate a search query from a first language to a second language, compare the translated query with content in the second language, and identify content in the second language relevant to the translated query based on the comparing.

This, and other aspects, can include one or more of the following features. The engine can be configured to translate the search query into a plurality of other languages, compare each of the translated search queries with content in a language corresponding to each of the other languages, and identify relevant content in the other languages based on the comparing. The engine can further be configured to translate the search query into an intermediate language, and translate the intermediate language search query into the plurality of other languages. The engine can further be configured to receive the search query from a first network location of a plurality of network locations. The engine can further be configured to obtain content from one or more network locations of the plurality of network locations. The identified content can be included in at least a portion of a second network location of the plurality of network locations. The second network location can be identified by a second identifier. The engine can further be configured to present the second identifier to a user at the first network location. The engine can further be configured to detect a selection of the second identifier, in response to the detecting, retrieve the content written at the second of network location, translate the content written at the second network location into the first language, and present the translated content to a user at the first network location. The engine can further be configured to compare the search query with content written in the first language. The engine can further be configured to identify content written in the first language relevant to the search query based on the comparing. The identified content can be located in at least a portion of a third network location. The third a network location can be identified by a third identifier. The engine can further be configured to present the third identifier to a user at the first network location. The second language can be chosen based on user input. The second language can be chosen based on the search query.

In another aspect, a system is described. The system includes means for translating a search query from a first language to a second language, means for comparing the translated query with content in the second language, and means for identifying content in the second language relevant to the translated query based on the comparing.

This, and other aspects, can include one or more of the following features. The system can include means for translating the search query into a plurality of other languages, means for comparing each of the translated search queries with content in a language corresponding to each of the other languages, and means for identifying relevant content in the other languages based on the comparing. The system can include means for translating the search query into an intermediate language, and means for translating the intermediate language search query into the plurality of other languages. The system can include means for receiving the search query from a first network location of a plurality of network locations. The system can include means for obtaining content from one or more network locations of the plurality of network locations. The identifier content can be included in at least a portion of a second network location of the plurality of network locations. The second network location can be identified by a second identifier. The system can include means for presenting the second identifier to a user at the first of network location. The system can include means for detecting a selection of the second identifier, means for retrieving the content written at the second network location in response to the detecting, means for translating the content written at the second network location into the first language, and means for presenting the translated content to a user at the first network location. The system can include means for comparing the search query with content written in the first language. The system can include means for identifying content written in the first language relevant to the search query based on the comparing. The identified content can be located in at least a portion of a third network location. The third a network location can be identified by a third identifier. The system can include means for presenting the third identifier to a user at the first network location. The second language can be chosen based on user input. The second language can be chosen based on the search query.

In another aspect, a computer-implemented method is described. The method includes translating content in a second language at one or more network locations into a first language, comparing the translated content with a search query written in the first language, and identifying from the translated content, content relevant to the query based on the comparing.

This, and other aspects, can include one or more of the following features. The method can include receiving a search query from a first network location of a plurality of network locations. The identified content can be included in at least a portion of a second network location of the one or more network locations. The second network location can be identified by a second identifier. The method can include presenting the second identifier to a user at the first network location. The method can include detecting a selection of the second identifier, and in response to the detecting, presenting the translated content of the second network location to a user at the first network location. The method can include comparing the search query with content in the first language located at one or more network locations of the plurality of network locations. The method can further include identifying content in the first language relevant to the search query based on the comparing. The identified content can be located at a third network location. The third network location can be identified by a third identifier. The method can further include presenting the third identifier to a user at the first network location. The first language can be chosen based on user input. The first language can be chosen based on the query.

In another aspect, a system is described. The system includes an engine configured to translate content in a second language at one or more network locations into a first language, compare the translated content with a search query written in the first language, and identify, from the translated content, content relevant to the query based on the comparing.

This, and other aspects, can include one or more of the following features. The engine can be configured to receive the search query from a first network location of a plurality of network locations. The identified content can be included in at least a portion of a second network location of the one or more network locations. The second network location can be identified by a second identifier. The engine can be configured to present the second identifier to a user at the first network location. The engine can be configured to detect a selection of the second identifier, and in response to the detecting, present the translated content of the second network location to a user at the first network location. The engine can further be configured to compare the search query with content in the first language located at one or more network locations of the plurality of network locations. The engine can further be configured to identify content in the first language relevant to the search query based on the comparing. The identified content can be located at a third network location. The third network location can be identified by a third identifier. The engine can further be configured to present the third identifier to a user at the first network location. The first language can be chosen based on user input. The first language can be chosen based on the query.

In another aspect, a system is described. The system includes means for translating content in a second language at one or more network locations into a first language, means for comparing the translated content with a search query written in the first language, and means for identifying, from the translated content, content relevant to the query based on the comparing.

This, and other aspects, can include one or more of the following features. The system can include means for receiving a search query from a first network location of a plurality of network locations. The identified content can be included in at least a portion of a second network location of the one or more network locations. The second network location can be identified by a second identifier. The system can further include means for presenting the second identifier to a user at the first network location. The system can further include means for detecting a selection of the second identifier, and means for presenting the translated content of the second network location to a user at the first network location in response to the detecting. The system can further include means for comparing the search query with content in the first language located at one or more network locations of the plurality of network locations. The system can further include means for identifying content in the first language relevant to the search query based on the comparing. The identified content can be located at a third network location. The third network location can be identified by a third identifier. The system can include means for presenting the third identifier to a user at the first network location. The first language can be chosen based on user input. The first language can be chosen based on the query.

The system and techniques described here may present one or more of the following advantages. The volume of searched content may be expanded by including content written in different languages thereby potentially presenting a user with more relevant search results. A user can be presented with information relevant to a topic of interest even if the information is not in a user's language. For example, if an English speaking user searches for a recipe of a Chinese dish, content written in Chinese can be included in the content that is searched. An authentic recipe of the dish written in Chinese can be found, translated into English, and presented to the user. In this manner, the volume of content searched can be expanded beyond just the language used in the search query. Additionally, results retrieved and presented can be more relevant to the user's search query. Advertisers targeting users based on their search results can identify a user's language and present users with relevant advertisements in the user's language.

The details of one or more implementations are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Figure 1:
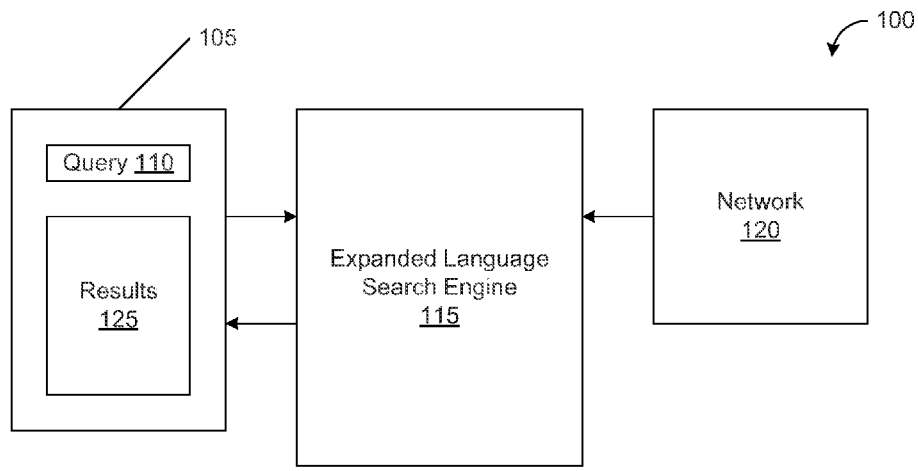
FIG. 1 is a schematic of a system for searching content written in several languages.

FIG. 1 depicts a schematic of an example of a system 100 configured to expand the volume of content that is searched in response to a user's search request. The system 100 can include a network location 105, wherein the network is the internet. The network location 105, which can be a web page on a web site, can be configured to receive a query 110, for example, entered or otherwise submitted by a user. The system 100 can include an expanded language search engine (ELSE) 115 to receive the query 110 from the network location 105. The ELSE 115 can be configured to compare the query 110 to content located at one or more locations on the network 120 written in a language the same as and/or different from the language of the query 110. The ELSE 115 can identify one or more locations on the network 120 containing content relevant to the query 110. The identified content may or may not be in the same language as that of the query 110. The ELSE 115 can translate the content at the identified locations of the network 120 into a specified language including the language of the query 110, one or more languages specified by the user, or both. The ELSE 115 can present the translated content as search results 125 to the network location 105 wherefrom the query 110 was received. For example, the ELSE 115 can retrieve identifiers that point to one or more locations of the identified content and present the identifiers as a list of results 125 to the network location 105.

In one example, in which the network is the internet, the network location 105 can be a search engine web page such as www.google.com. A user can use the web page to interact with the Google search engine, for example, by entering the uniform resource locator (URL), www.google.com, in a web browser, e.g., internet explorer, which will cause the Google search page to appear in the browser. A user can enter a query 110 in a text box provided by the Google search engine web page. In some implementations, the query 110 can be a string of text which the ELSE 115 can receive and identify one or more words and word phrases in the string of text. The ELSE 115 can translate the query 110 into one or more languages. Subsequently, the ELSE 115 can compare the query 110 in the received language as well as in the translated languages to content on the network 120. The content on the network 120 can be in any language including the language of the query 110 and the one or more languages into which the query 110 is translated. Based on the comparing, the ELSE 115 can identify one or more network locations containing content relevant to the query 110. The ELSE 115 can present to the user, identifiers that point to the one or more network locations that include content relevant to the query 110 as the result 125 of the search. A user can select one or more of the identifiers to access the network location to view the content. Upon detecting that the user has selected an identifier, the ELSE 115 can retrieve the contents of the network location to which the selected identifier points and translate the content of the network location into the language of the query 110. The ELSE 115 can present the translated content to the network location 105. The network location that the user selected can include content written in the user's language, content written in one or more foreign languages, or both. The ELSE 115 can translate all content located at the selected network location that is written in any foreign language into the user's language.

Figure 2:
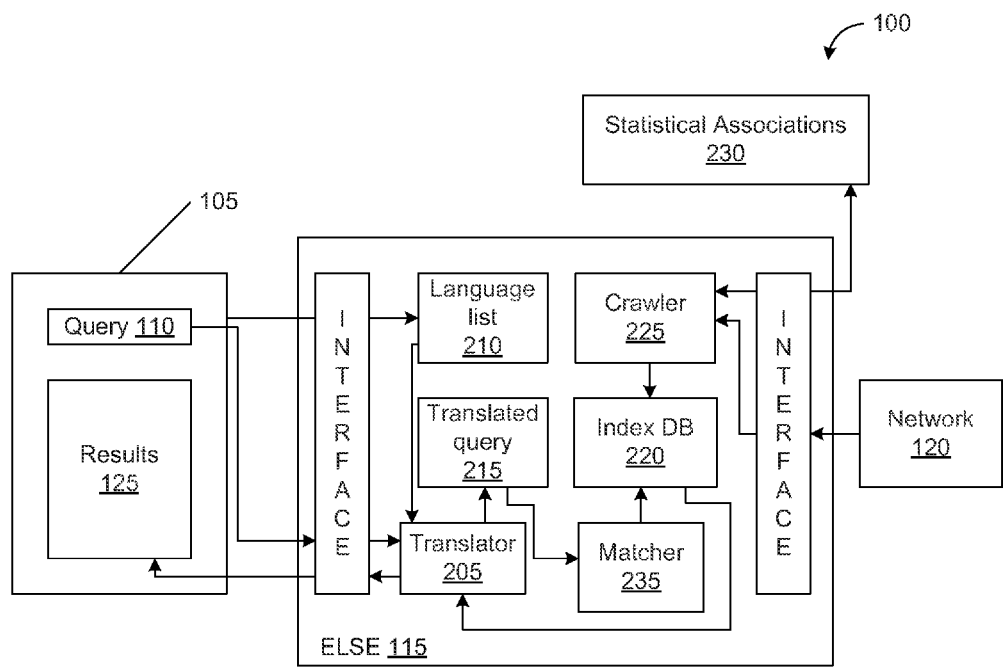
FIG. 2 is a schematic of a system for translating search queries into multiple languages as part of a search.

FIG. 2 depicts a schematic of an example of a system 100 for identifying content on a network 120 written in a language different from the language of the query 110. In some implementations, the ELSE 115 can include a translator 205 configured to receive the contents of the query 110 through an interface. The translator 205 can translate the query 110 into one or more languages, where the languages can be chosen from a language list 210 included in the ELSE 115. The ELSE 115 can dynamically translate the query 110 into each language on the list. In some implementations, the language list 210 can include one or more languages specified by a user. For example, the ELSE 115 can present to a user, a list of languages into which a query 110 can be translated. A user can select one or more languages from the list of languages. Alternatively, the language list 210 can be populated with languages based on one or more factors including the popularity of the language, attributes of the user, search history, relevance to the subject matter of the query, and the like. In addition, languages can be chosen based on factors including the character type entered by the user (e.g., Chinese characters, Greek characters, and the like), the browser's language settings, the domain of the search engine (e.g., google.cn for Chinese, google.tw for Taiwan-Chinese, and the like), user input, and the like. In some implementations, the ELSE 115 can identify one or more words or word phrases in the query 110. The translator 205 can be configured to perform a literal translation of each identified word in the query 110, a contextual translation of each identified word phrase in the query 110, or combinations thereof. In some implementations, the translator 205 can be obtained from translate.google.com. Alternatively, or in addition, any commercially available translator can be used.

In some implementations, the ELSE 115 can receive the content located at one or more locations on the network 120 through an interface. The ELSE 115 can include an index database 220, where content at locations on the network 120 can be stored. In some implementations, the ELSE 115 can include a crawler 225 that can be configured to index the content at each network location. The crawler 225 can traverse the network locations, index the content at each location, and store the content in the index database 220. In addition, the crawler 225 can generate statistical associations 230 between keywords and the network content 120. The statistical associations 230 can identify one or more words at a network location and relate the identified words to keywords. For example, if the crawler identifies the word "cycling" at a network location, the statistical associations 230 can relate "cycling" to "biking" Subsequently, for any search related to biking, the ELSE 115 can include the network location including "cycling" in the search results.

Content at the locations on the network 120 can be written in several languages. All content at a network location can be written in the same language, the language being different from the language of the query 110. Alternatively, the content at a network location can be written in several languages including, or excluding, the language of the query 110. The crawler 225 can be configured to traverse a network location, index the content written in one or more languages, and store the content written in each of the one or more languages in the index database 220. In addition, the ELSE 115 can be configured to identify the one or more languages. For example, the ELSE 115 can identify the languages based on attributes obtained from the network location. Alternatively, the ELSE 115 can identify the languages by comparing one or more words determined by the crawler 225 with words in the index database 220. The language can be identified through one or more signals including the domain name where the content resides, e.g., www.sina.cn, the character set of the content, the vocabulary of the content, e.g., Spanish, Portuguese, and the like. The ELSE 115 can store the contents identified by the crawler 225 in the index database 220 based on the one or more languages. In some implementations, the ELSE 115 can group all content written in the same language. Alternatively, the ELSE 115 can group content at the same network location, regardless of the language in which the content is written. The content stored in the index database 220 can be sorted based on several factors including language.

The ELSE 115 can include a matcher 235 configured to match the translated query 215 with content in the index database 220 written in the language of the translated query 215. For example, a user can enter a query 110 in English. One of the languages in the language list 210 can be Chinese. The translated query 215 can be the query 110 translated into Chinese. The network 120 can include locations containing content written in Chinese. The content at these locations can be indexed and stored in the index database 220. The matcher 235 can identify that the language of the translated query 215 is Chinese and match the translated query 215 with Chinese content in the index database 220. Subsequently, the ELSE 115 can compare the translated query 215 with the Chinese content in the index database 220 to identify content relevant to the translated query 215. In addition, in this example, the matcher 235 can compare the query 110 with English content in the index database 220 to identify content relevant to the query 110. In this manner, the ELSE 115 can identify content in the index database 220 that is written in a language into which the query 110 is translated. In some implementations, the ELSE 115 can perform the query translation, matching, and searching in serial. For example, for each language into which the query 110 is translated, the ELSE 115 can translate the query, match the translated query to content in the translated language in the index database 220, and search the index database 220 for relevant content. Alternatively, the ELSE 115 can perform the query translation, matching, and searching in parallel for all languages into which the query 110 is translated. In some implementations, the translation, matching, and searching process can be performed, both, in serial, and in parallel.

Upon identifying content relevant to the query 110 based on comparing the translated query 215 with contents in the index database 220, the ELSE 115 can present the identified content to the network location 105. In some implementations, the index database 220 can include the content of a network location as well as an identifier, e.g., a URL, that points to the network location. The ELSE 115 can retrieve the identifier for each network location determined to include content relevant to the query 110 based on the comparing. The ELSE 115 can generate a list including the identifiers and present the list of identifiers as results 125 at the network location 105. In addition, the ELSE 115 can include, in the results 125, snippets that contain text included at the identified locations on the network, wherein the text included is relevant to the query 110 and is either in the language of the query 110 or in the one or more languages of the translated query 215. The text in the one or more languages of the translated query 215 can be translated into the language of the query 110 when included in the snippet.

Figure 3:
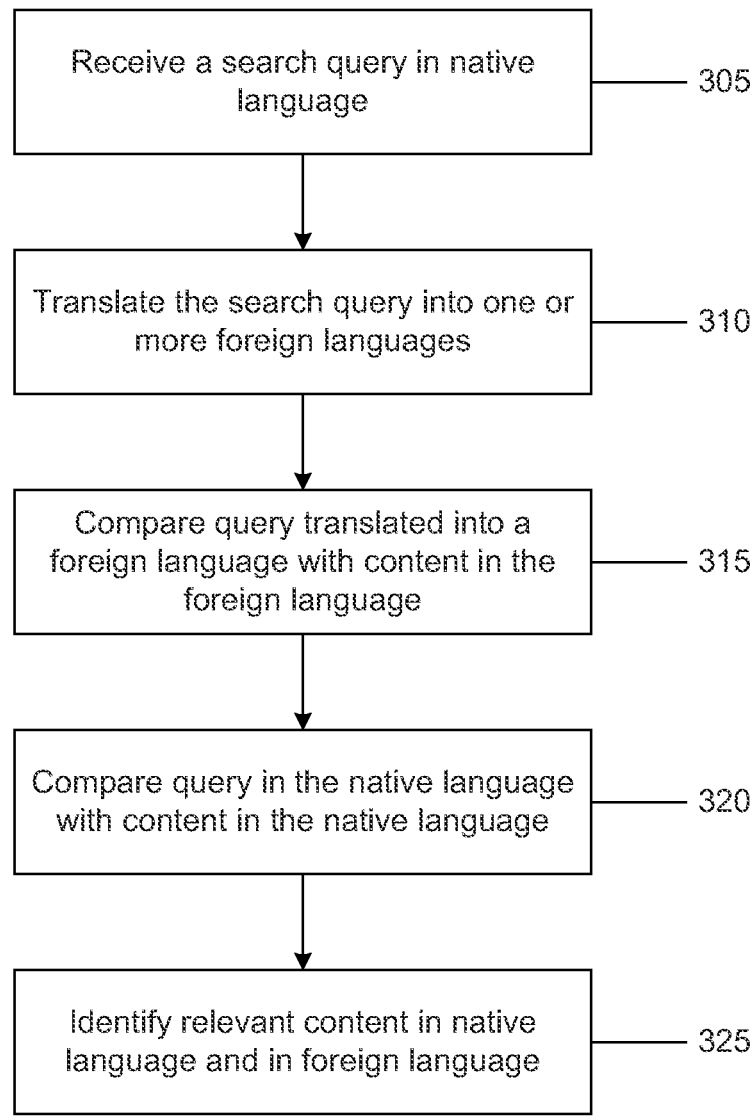
FIG. 3 is a flow chart of an example of a process for expanding the languages searched for content.

FIG. 3 depicts a flow chart of an example of a process for expanding the languages searched to retrieve content relevant to a query. In some implementations, a search query is received in a native language at 305, where the native language is the language in which the user enters the search query. The native language can depend on the location of the user. For example, a user in a country may enter a search query in the language of the country. Alternatively, the language can depend on the nature of the search query. For example, a user looking for information relevant to a country may enter the search query in the language of the country. The native language can be chosen by a system or by a user. The system can be connected to a network. In some implementations, the network can be the internet. The system can be a computer connected to the internet, a mobile device, or other electronic retrieval device.

In some implementations, the search query can be translated from the native language into one or more foreign languages at 310. The one or more foreign languages can be selected by a user. Alternatively, a list of foreign languages can be created and the search query in the native language can be translated into all the foreign languages in the list. The languages in the list of foreign languages can be chosen based on factors including the popularity of the language in the network, the contents of the search query, past searches conducted by the user, a user's profile, based on search contents, or based on other criteria. In some implementations, the list of languages can be updated to add or remove foreign languages into which the search query in the native language can be translated. In some implementations, the search query in the native language can be dynamically translated into the languages on the list of foreign languages. Alternatively, the search query can be translated into the one or more foreign languages, and each translated search query can be stored.

In some implementations, the translated search query in the foreign language can be compared with content on the network, also written in the foreign language at 315. The network can be the internet. The content on the network can include content written on one or more web pages of one or more web sites. The content can be collected and stored in an index database. The content can be separated on factors including the language in which the content is written. A network location can include content written in the native language as well as one or more of the foreign languages. The content stored in the index database can include words and word phrases in the native language and in the one or more foreign languages found at each network location. Comparing the translated query and the contents of the network location can include comparing the translated query with words, found in the network content, that are stored in the index database. The translation can include a literal translation of each word and word phrase in the search query. Alternatively, or in addition, the translation can include a contextual translation. The comparing can include comparing each translated word and word phrase with contents in the index database to identify network locations containing same or similar words and word phrases. Based on the comparing, a network location can be identified as including content relevant to the search query.

In some implementations, in addition to comparing the translated query with the contents of the network, the search query in the native language can also be compared with the contents of the network at 320. In such a comparison, the content with which the query is compared can be language written in the native language. The search query in the native language can be translated and compared in a serial manner, parallel manner, or combinations thereof. For example, the search query can be translated into one of the foreign languages in the list of languages, and compared with the contents in the index database. In other implementations, the search query in the native language can be translated and compared in a parallel manner. For example, the search query can be translated into each of the foreign languages, and simultaneously compared with the contents of the index database.

Based on the comparing, relevant content in the native and foreign language can be identified at 325. The identified content can either be only in one foreign language or in several foreign languages. In addition, the identified content can include content written in the native language. In some implementations, the identified content can include content in both the native language as well as one or more foreign languages. The identified content can be located at a network location. The identified content can constitute at least a portion of the network location. Alternatively, the identified content can be the only content at the network location. The network location can be identified by an identifier, e.g., a URL, included in the index database. Upon identifying content located at a network location to be relevant to a search query, the identifier pointing to the network location can be presented to a user as a result of the search. More than one network location can be identified, and more than one identifier corresponding to each identified location can be presented to the user. In some implementations, a group of identified locations can be collectively identified by the same identifier. A user can select the identifier to view the contents written at the network location. In some implementations, the identifier can be translated into the user's language for presentation to the user. In addition, an indication of the language from which the identifier was translated can also be provided to the user, e.g., by incorporation into the identifier.

When the user selects an identifier, the content written at the corresponding network location can be retrieved for presentation to the user. Optionally, the identified content written in the foreign language can be translated into the native language. Translation can extend to all the content at the network location, be restricted to only the content determined to be relevant to the search query, or combinations thereof can be translated. Alternatively, only the content determined to contain content relevant to the search query, based on the comparing, can be translated. In some implementations, a network location determined to contain relevant content can include content in several languages, including two or more different foreign languages as well as the native language. In translating the content, all the content at the identified network location can be translated to the native language. When the translating and comparing is done in a serial manner, the identified content at the one or more network locations can be translated into the native language in a serial manner. When the translating and comparing is done in a parallel manner, all the identified content at one or more network locations can be simultaneously translated into the native language. The identified content including content in the native language and content, originally written in a foreign language and translated into the native language can be presented as the results of the query. The one or more foreign languages, in which the content of the identified network location is written, can be determined when the content is traversed for inclusion in the index database. Alternatively, or in addition, the one or more foreign languages can be specified by a publisher of the network location. In addition, the user can also be provided with an identifier pointing to the network location that contains the relevant content in a language other than the user's native language.

Figure 4:
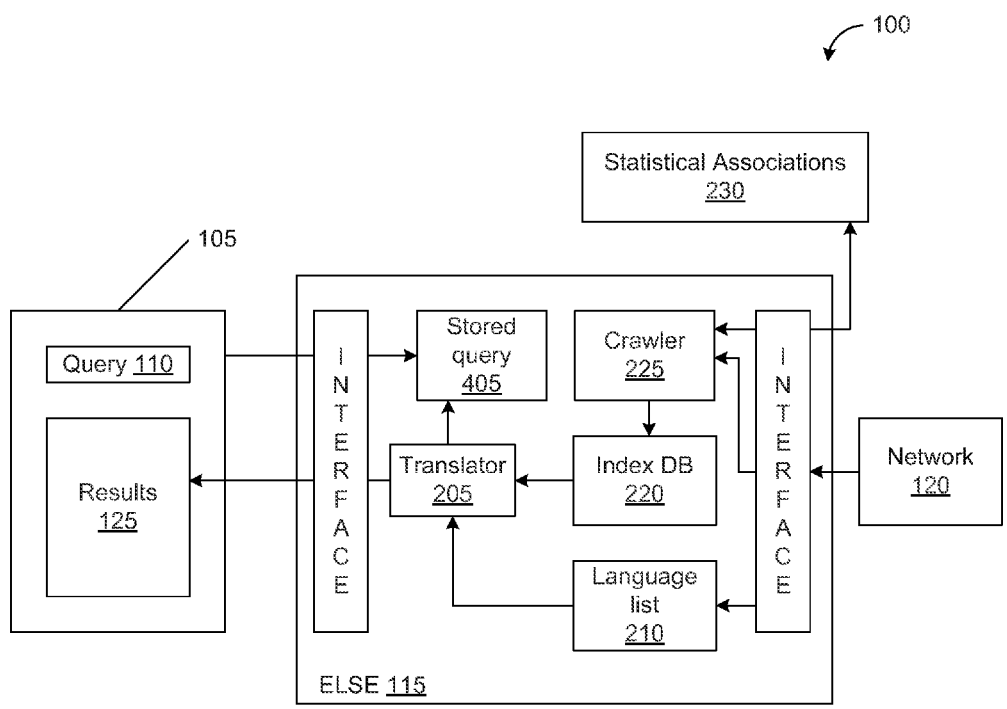
FIG. 4 is a schematic of a system for translating network content into multiple languages during a search.

A number of implementations have been described. Nevertheless, it will be understood that various modifications may be made without departing from the spirit and scope of the disclosure. For example, the contents of the network can be translated and the query can be retained in the native language. FIG. 4 depicts a schematic of an example of a system 100 wherein the contents of the network are translated into a native language in which the query is received. The query 110 can be entered at a network location 105, where the network 120 is the internet. The network location 105 can be a web page at a web site. A user can access the network location 105 using a computer. In some implementations, the user can enter the query 110 as a string of text in a text box on the network location 105. The user can enter the query 110 in a native language. For example, a user can enter the query in Chinese.

The ELSE 115 can be configured to receive and store the query 405 in an index database 220 that includes content that can be found at one or more locations on the network 120. A web crawler 225 can be configured to traverse the locations on the network 120, identify content at the locations, and store the identified content in the index database 220. In addition, the web crawler 225 can generate statistical associations 230 that can further be used to identify contents relevant to a query 110. The content on network 120 can be in one or more languages including the native language and foreign languages. The ELSE 115 can include a translator 205 configured to translate the content in the index database 220 from the language in which the content is written to the native language. In this manner, content on the network can be translated into the native language regardless of the language in which it is written. Subsequently, the ELSE 115 can compare the stored query 405, which is written in the native language, to the translated content in the network 120, which is also in the native language. Based on the comparing, the ELSE 115 can identify one or more locations on the network 120 that contain content relevant to the query 110.

The ELSE 115 can identify one or more locations on the network 120 that contain content relevant to the query 110.

Upon identifying such locations, the ELSE 115 can present the one or more identified locations to the network location 105, wherefrom the query 110 was received, as search results 125. In some implementations, the index database 220 can include an identifier, e.g., a URL, that points to the identified network location. The ELSE 115 can present the identifiers of each identified network location to the network location 105. In some implementations, the ELSE 115 can generate a list of identifiers. In addition, the ELSE 115 can include snippets of information which can include content on the identified network locations that are translated into the native language and where key words that match and/or are similar to the query 110 are highlighted.

In some implementations, the ELSE 115 can dynamically translate the contents of the network 120 for comparing with the stored query 405. The ELSE 115 can choose a language into which the contents are translated based on a language list 210. The language list 210 can be populated based on a user's choice. Alternatively, or in addition, the language list 210 can be populated based on factors including a user's search history, a profile of a user containing user preferences, popularity of the language, contents of the search query, and the like. The ELSE 115 can serially translate and compare content one language at a time. Alternatively, the ELSE 115 can translate and compare content in all languages in the language list 210 in a parallel manner. In other implementations, the translation and comparison can be a combination of serial and parallel processing.

In some implementations, the ELSE 115 can store the translated network content. The ELSE 115 can monitor the network to continuously update the index database 220. The ELSE 115 can update the stored, translated content when the index database 220 is updated. Alternately, or in addition, the ELSE 115 can update the stored, translated content based on a user's preference.

In some implementations, the ELSE 115 can provide translated search queries as an output. The translated search queries can be transmitted to an external device to compare with contents of the network. The translated search queries can be transmitted by either wired or wireless means over a network. Alternatively, the translated queries can be stored on a storage device that can be read using a computer-readable medium.

In some implementations, the ELSE 115 can be operatively coupled to a search engine which can provide search results to a user based on search queries received. If the search engine retrieves poor or insufficient search results for reasons including the language of the search queries, the search engine can be configured to activate the ELSE 115 in order to expand the language search. In other implementations, the user can choose to include or exclude the ELSE 115 during searches.

In some implementations, the ELSE 115 can provide translated content on the network as an output. The translated content can be transmitted to an external device where the translated content can be compared with a query. The translated content can be transmitted over wired or wireless networks. Alternatively, or in addition, the translated content can be transmitted by storing the translated content on a storage device that can be read on a computer-readable medium.

In some implementations, the identifier pointing to a network location can be in a foreign language. The ELSE can be configured to translate the identifier into the native language in which the query was received.

In some implementations, the query can include one or more words, word phrases, numbers, alphanumeric characters, and the like. The words and word phrases in the query can be separated by delimiters, Boolean operators, or both. Alternatively, the query can be in any format including an audio file, a video file, and the like.

In some implementations, the ELSE 115 can rank the one or more network locations identified as containing content relevant to the query. In some implementations, the ELSE 115 can rank the network locations using the methods and techniques described in "Method for node ranking in a linked database," inventors: L. Page, U.S. Pat. No. 6,285,999, issued Sep. 4, 2001, the entire content of which is incorporated herein by reference. The ELSE 115 can rank all network locations containing content written in the same language and present the top ranked network locations in the results. Alternatively, or in addition, the ELSE 115 can rank the network locations containing content written in any language and present the top ranked network locations in the results. In such implementations, the ELSE 115 can use the translated content written at the one or more locations on the network for the ranking In some implementations, a server hosting the network location can include web pages written in one or more foreign languages. The ELSE 115 can retrieve all the web pages at a web site regardless of the language in which the web page is written. Alternatively, the ELSE 115 can retrieve only the web pages written in one or more of the languages in the language list 210. The ELSE 115 can identify the language in which the web page is written based on factors including the web page attribute, web page content, and the like.

In some implementations, the ELSE 115 can receive advertisements from advertisers to be presented at the network location wherefrom the query was received. Based on factors including the native language of the query, the rank of the network locations in the results, and the like, the ELSE 115 can translate the advertisement into one or more languages including the native language when presenting the advertisements at the network location 105. Alternatively, the ELSE 115 can request advertisers to input advertisements in a language based on the native language of the query. In other implementations, the advertisers can provide advertisements in one or more languages. The ELSE 115 can choose the advertisement in a particular language based on the factors such as the native language of the query and the like.

In some implementations, the network can be an intranet. For example, the network can be a network including nodes in several countries. The nodes can be connected to a central engine. Users in one country can interact with the engine in the user's native language. In response to any queries or requests for information by the user in one language, the central engine can identify content at other nodes of other users, where the content at the other nodes are in a language different from the native language. The identified content can be translated and presented to the user in the user's native language. In some implementations, the network can be an online social network. Members of the online social network can create profiles on the network and use the social network to meet other members. The contents of one member's profile can be translated and compared with the contents of another member's profile to determine matching interests. Alternatively, all the profiles on the social network can be translated into a language in which a member's profile is written. The translated content can be compared with the content of the member's profile to determine matching interests. Accordingly, other implementations are within the scope of the following claims.

In some implementations, the search query can be translated from a first language, e.g., the user's language, into a base language, and translated into multiple languages from the base language. Similarly, the corpii on the network can be translated into a base language and, subsequently, translated into the user's language.

While reference is made to locating content that is available on a network that is written in a language different than the language of a proposed search query, the system and methods disclosed can be used to locate other forms of content (e.g., audio, video, etc.) based on translations of other forms of content into, e.g., content of the same type in a different language, translations into text in a different language, or both.

Implementations of the subject matter and the functional operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

What is claimed is:

1. A non-transitory computer-readable medium storing software instructions executable by data processing apparatus to perform operations comprising:
   receiving a search query including content in a first spoken language, the search query relating to a topic based on a subject matter of the content included in the search query;
   determining a relevance of the topic of the search query to each potential second spoken language from a set of potential second spoken languages different from the first spoken language;
   selecting a subset of potential second spoken languages based on the-relevance of each potential second spoken language to the topic of the search query, the subset having fewer potential second spoken languages than the set of potential second spoken languages in its entirety;
   translating content included in one or more network locations in each of the potential second spoken languages of the subset into translated content in the first spoken language;
   comparing the translated content in the first spoken languages with the content included in the search query in the first spoken language, wherein the translated content in the first spoken language includes translated content that satisfies the search query, the translated content that satisfies the search query being a translation of the content that satisfies the search query in each of the potential second spoken languages of the subset into the first spoken language;

identifying from the translated content in the first spoken language, the translated content that satisfies the query based on the comparing; and providing the translated content that satisfies the search query in response to receiving the search query.

2. The medium of claim 1 wherein the search query is received from a first network location of a plurality of network locations.

3. The medium of claim 2 wherein the translated content that satisfies the search query is included in at least a portion of a second network location of the one or more network locations.

4. The medium of claim 3 wherein the second network location is identified by a second identifier.

5. The medium of claim 4, the operations further comprising presenting the second identifier to a user at the first network location.

6. The medium of claim 1, the operations further comprising comparing the content included in the search query with content in the first spoken language included in one or more network locations.

7. The medium of claim 6 further comprising identifying content in the first spoken language that satisfies the search query based on the comparing.

8. The medium of claim 7, wherein the content in the first spoken language that satisfies the search query is located at a third network location.

9. The medium of claim 8, wherein the third network location is identified by a third identifier.

10. The medium of claim 9, the operations further comprising presenting the third identifier to a user at the first network location.

11. The medium of claim 1 wherein the first spoken language is chosen based on user input.

12. The medium of claim 1 wherein the content included in the search query includes a plurality of characters, and wherein the first spoken language is chosen based on a character type of the plurality of characters included in the search query.

13. The medium of claim 1, wherein the selecting is further based on at least one of (i) popularity of each of the potential second spoken languages, (ii) attributes of a user, (iii) search history, and (iv) character type entered into the search query.

14. A computer-implemented method comprising:

receiving, by data processing apparatus, a search query including content in a first spoken language, the search query relating to a topic based on a subject matter of the content included in the search query;

determining a relevance of the topic of the search query to each potential second spoken language from a set of potential second spoken languages different from the first spoken language;

selecting a subset of potential second spoken languages based on the relevance of each potential second spoken language to the topic of the search query, the subset having fewer potential second spoken languages than the set of potential second spoken languages in its entirety;

translating, by the data processing apparatus, the content included in the search query to translated content in each of the potential second spoken languages of the subset that is determined based on the content included in the search query;

identifying, by the data processing apparatus, content in each of the potential second spoken languages of the subset that satisfies the translated search query from content included in one or more of a plurality of network locations that include content in each of the potential second spoken languages of the subset;

identifying, by the data processing apparatus, content in the first spoken language that satisfies the search query from content included in one or more of another plurality of network locations that include content in the first spoken language;

translating, by the data processing apparatus, the identified content in each of the potential second spoken languages of the subset into the first spoken language; and providing, by the data processing apparatus, the translated identified content in the first spoken language and the identified content in the first spoken language in response to receiving the search query.

15. The method of claim 14, wherein each of the one or more of the plurality of network locations is represented by a corresponding first identifier and each of the one or more of the other plurality of network locations is represented by a corresponding second identifier, and wherein providing the translated identified content in the first spoken language and the identified content in the first spoken language in response to receiving the search query comprises:

providing one or more first identifiers that represent the one or more of the other plurality of network locations from which the content in the first spoken language has been identified; and providing one or more second identifiers that represent the one or more of the plurality of network locations from which the content in each of the potential second spoken languages of the subset has been identified.

16. The method of claim 14 wherein the selecting is further based on at least one of (i) popularity of each of the potential second spoken languages, (ii) attributes of a user, (iii) search history, and (iv) character type entered into the search query.

17. A non-transitory computer-readable medium storing software instructions executable by data processing apparatus to perform operations comprising:

receiving a search query including content in a first spoken language, the search query relating to a topic based on a subject matter of the content included in the search query;

determining a relevance of the topic of the search query to each potential second spoken language from a set of potential second spoken languages different from the first spoken language;

selecting a subset of potential second spoken languages based on the relevance of each potential second spoken language to the topic of the search query, the subset having fewer potential second spoken languages than the set of potential second spoken languages in its entirety;

translating the content included in the search query to translated content in each of the potential second spoken languages of the subset that is determined based on the content included in the search query;

identifying content in each of the potential second spoken languages of the subset that satisfies the translated search query from the content included in one or more of a plurality of network locations that include content in each of the potential second spoken languages of the subset;

identifying content in the first spoken language that satisfies the search query from content included in one or more of another plurality of network locations that include content in the first spoken language;

translating the identified content in each of the potential second spoken languages of the subset into the first spoken language; and providing the translated identified content in the first spoken language and the identified content in the first spoken language in response to receiving the search query.

18. The medium of claim 17, wherein each of the one or more of the plurality of network locations is represented by a corresponding first identifier and each of the one or more of the other plurality of network locations is represented by a corresponding second identifier, and wherein providing the translated identified content in the first spoken language and the identified content in the first spoken language in response to receiving the search query comprises:

providing one or more first identifiers that represent the one or more of the other plurality of network locations from which the content in the first spoken language has been identified; and providing one or more second identifiers that represent the one or more of the plurality of network locations from which the content in each of the potential second spoken languages of the subset has been identified.

19. The medium of claim 17 wherein the selecting is further based on at least one of (i) popularity of each of the potential second spoken languages, (ii) attributes of a user, (iii) search history, and (iv) character type entered into the search query.

20. A system comprising:

data processing apparatus; and a non-transitory computer-readable medium storing software instructions executable by the data processing apparatus to perform operations comprising;

receiving a search query including content in a first spoken language, the search query relating to a topic based on a subject matter of the content included in the search query;

determining a relevance of the topic of the search query to each potential second spoken language from a set of potential second spoken languages different from the first spoken language;

selecting a subset of potential second spoken languages based on the relevance of each potential second spoken language to the topic of the search query, the subset having fewer potential second spoken languages than the set of potential second spoken languages in its entirety;

translating the content included in the search query to translated content in each of the potential second spoken languages of the subset that is determined based on the content included in the search query;

identifying content in each of the potential second spoken languages of the subset that satisfies the translated search query from the content included in one or more of a plurality of network locations that include content in each of the potential second spoken languages of the subset;

identifying content in the first spoken language that satisfies the search query from content included in one or more of another plurality of network locations that include content in the first spoken language;

translating the identified content in each of the potential second spoken languages of the subset into the first spoken language; and providing the translated identified content in the first spoken language and the identified content in the first spoken language in response to receiving the search query.

21. The system of claim 20, wherein each of the one or more of the plurality of network locations is represented by a corresponding first identifier and each of the one or more of the other plurality of network locations is represented by a corresponding second identifier, and wherein providing the translated identified content in the first spoken language and the identified content in the first spoken language in response to receiving the search query comprises;

providing one or more first identifiers that represent the one or more of the other plurality of network locations from which the content in the first spoken language has been identified; and providing one or more second identifiers that represent the one or more of the plurality of network locations from which the content in each of the potential second spoken languages of the subset has been identified.

22. The system of claim 20 wherein the selecting is further based on at least one of (i) popularity of each of the potential second spoken languages, (ii) attributes of a user, (iii) search history, and (iv) character type entered into the search query.

* * * * *